(12) United States Patent
Haikin

(10) Patent No.: US 6,449,050 B1
(45) Date of Patent: Sep. 10, 2002

(54) CODE GENERATOR FOR PRINTER DRIVER

(75) Inventor: John S. Haikin, Fremont, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/165,736

(22) Filed: Oct. 5, 1998

(51) Int. Cl.$^7$ .............................................. G06F 13/00
(52) U.S. Cl. ........................... 358/1.1; 358/1.6; 358/1.7
(58) Field of Search ........................ 358/1.1, 1.5, 1.12, 358/1.13, 1.14, 1.15, 1.16, 1.17, 1.18; 341/20, 22

(56) References Cited

U.S. PATENT DOCUMENTS 5,603,043 A * 2/1997 Taylor et al. ................ 364/491
5,749,079 A * 5/1998 Yong et al. .................. 707/100

FOREIGN PATENT DOCUMENTS

WO WO 95/00901 1/1995 ............. G06F/9/44

\* cited by examiner

Primary Examiner—Mark Wallerson
(74) Attorney, Agent, or Firm—Fitzpatrick, Cella, Harper & Scinto (57) ABSTRACT

A code generator together with a pre-compiled library of proprietary printer functions having entry points accessible by a link editor. The code generator obtains design parameters for a printer driver, the design parameters including parameters relating to input functionality, output functionality, user interface functionality, and print data processing functionality. In addition, the code generator obtains a pointer to a printer port function that interfaces directly to a printer port. Preferably, the code generator also obtains an other pointer to an other function that uses a port or an operating system function to access a system resource. Thereafter, the code generator generates source code in a high-level language such as C or C++, with the source code implementing the design parameters by including calls to appropriate ones of the functions in the pre-compiled library, and by including a call to the system function such as a printer port function that causes printer data to be output to the printer port. The source code also preferably includes a call to the other function that accesses the system resource. Thereafter, the generated source code may be compiled by a standard compiler into a compiled object, and the compiled object can be linked by a link editor with the pre-compiled library of functions, so as to yield an executable which implements desired printer functionality.

61 Claims, 6 Drawing Sheets

CODE GENERATOR FOR PRINTER DRIVER

BACKGROUND OF THE INVENTION

1. Field of the Invention

The present invention relates to automatic generation of code in a higher level language (such as C or C++), with the generated code thereafter being compilable so as to obtain an executable to implement a printer driver.

2. Description of the Related Art

During initial development and writing of computer programs, software developers have come to rely on automatic code generators to generate source code in a high-level language (such as C or C++) that implements basic functionality of the new computer program. The code generator is, itself, a computer program that leads the software developer through a question-and-answer session, inquiring into the desired functionality of the new software, and thereafter generating source code to implement such functionality after the questions have been answered. After obtaining the generated source code from the code generator, the software developer can compile the software so as to obtain an executable which is a basic working version of his desired software. The source code can also be modified by the software developer so as to implement more specific aspects of the new software. Code generators are sometimes referred to as "wizards", and have been designed to generate code in any of a variety of high-level languages such as C, C++, Visual Basic, COBOL, Fortran, Pascal, PL/1, Mesa, ADA, and other non-object source code.

One technological area where automatic code generators have not generally been applied is the area of device drivers such as printer drivers. One reason for this is as follows: to obtain the highest quality printed output for modern day printers, printer drivers typically employ techniques that are unique for each individual manufacturer and model of printer, and these techniques are generally proprietary. Since automatic code generators generate source code, such techniques would be immediately apparent, rendering them non-proprietary. For example, in the case of color ink jet printers, color conversion techniques and halftone processing often employ specifics that are proprietary to the manufacturer of the printer.

Moreover, even to the extent that automatic code generators for printer drivers might be available, they are available only for interface to the GDI kernel of the Windows® operating system from Microsoft Corporation. Resulting printer drivers are therefore not compatible with other operating systems, such as the UNIX operating system and real-time operating systems such as WindRiver's Vx Works™ and Integrated Systems' pSOS™. These other operating systems, since they do not insulate the printer driver from the physical printer port like the Windows® GDI kernel, require printer drivers to be independently executable modules which access directly to the printer port.

These other operating systems also do not necessarily insulate the printer driver from system resources in the same way as the Windows® operating system. Depending on the operating system, the printer driver must directly access these system resources. For example, the printer driver might need to directly access input devices such as an image input device and user input devices (e.g., a mouse and a keyboard), memory management resources, process control resources, resource locking resources, output devices such as a display, storage devices such as a hard disk, and any other resources required for operation of the printer driver. These system resources typically are accessed either through a port or through an operating system function. These system resources can be implemented in hardware, or in software as operating system functions. The printer driver also might need to access other operating system functions such as controlled printed job termination functions and any other system functions that access system resources in ways that differ from one operating system to another. In addition, the printer driver might contain customized equivalents of these operating system functions.

The printer driver must know how to access these ports, including the printer port, and these operating system functions. In a case that the printer driver includes customized equivalents to operating system functions, the printer driver must know how to interact with the operating system in order to execute these equivalents.

SUMMARY OF THE INVENTION

It is therefore an object of the invention to provide a code generator for a printer driver which automatically generates source code for a printer driver that is compilable into an executable that directly accesses the printer port, and that accesses any other necessary ports and operating system functions, while at the same time shielding the software developer from any proprietary techniques for driving the printer.

Briefly, according to one aspect of the invention, an automatic code generator for a printer driver obtains, from the software developer, the design parameters for the printer driver. Design parameters generally concern input processing, user interface and output functionality. The design parameters can be obtained through an interactive question-and-answer session with the developer, through a database, through a script, or through other equivalent means.

Examples of parameters for input functionality include image input type and format. Parameters for processing functionality include, for example, complexity and flexibility of color transform and matching techniques available to the end user of the software, halftoning techniques such as selection between dither or error diffusion, and spooling support. Examples of parameters for user interface functionality include whether input from the end user is to be accepted, if a graphical interface is to be used for such input, and the design of such an interface. Parameters for output functionality include, for example, output format such as bitmap or one of several available page description languages (such as PCL5 or PostScript), font support and recording medium support (such as plain paper or transparency in the context of computer-aided tomography equipment).

The software developer also needs to provide a pointer to a function that interfaces directly to the printer port so that the printer driver can send print data to the printer port. Specifically, because each different operating system, and each different system in which the operating system resides, employs a different printer port and different printer port protocol, it is necessary for the software developer himself to provide a printer port function that actually interfaces to the printer port. According to the invention, the code generator generates source code that includes a call to this function whenever the printer driver needs to output printer data.

In addition to calling a printer port function, the printer driver might need to access system resources. Each different operating system, and each different system in which the operating system resides, can employ different ports and/or operating system functions for accessing system resources, and indeed the software developer may have written customized equivalents to such operating system functions. It is therefore necessary for the software developer himself to provide pointers to functions that access the ports or call the operating system functions that actually interface to these resources. According to the invention, the source code includes calls to the functions identified by these pointers whenever the printer driver needs to access the system resources. For example, in order to access system resources such as memory allocation or release, the generated code includes a call to the appropriate function using a pointer provided by the software developer. That function, in turn, accesses the system resource through the appropriate port or operating system function.

In further aspects of the invention, the source code generated by the code generator does not include source code relating to proprietary printer functions, such as proprietary color matching or halftoning techniques. Instead, such functions are provided to the software developer in pre-compiled library format, to which compiled source code may be linked. Accordingly, rather than generating source code with proprietary printer functions, the code generator of the present invention generates source code uses the functions in the library to implement such proprietary functions. Preferably, the generated source code includes variable definitions, such as for a table of printer operations, and this table is used by functions in the library so as to determine how to execute a printer driver. Alternatively, the source code includes calls to functions in the library to implement the printer driver.

Because the code generator of the present invention merely generates variable definitions for or calls to proprietary printer functions in a pre-compiled library, it is possible to provide software developers with a code generation tool that allows them quickly to generate printer drivers while shielding them from unnecessary disclosure of proprietary printer functionality.

Moreover, since it is the software developer who provides the functions (by providing pointers to the functions) that interface directly to the printer port and system resources such as memory allocation, the code generator according to the invention is easily portable from one operating system to another, and from one system implementing such operating systems to other such systems.

As an example, assume that the code generator determines, based on the functional design parameters, that pointers are needed to a printer port function, a memory management function, and a user input/output function. In that case, the printer port function directly accesses the physical printer port using the appropriate protocols for the operating system on which the printer driver runs. The memory management function calls operating system functions that handle memory management. Alternatively, the memory management function is a customized function that handles memory management. The user input/output function either calls operating system functions for user input/output, or directly accesses input and output devices through the appropriate ports.

In another aspect, the invention is a code generator together with a pre-compiled library of proprietary printer functions having entry points accessible by a link editor. The code generator obtains design parameters for a printer driver, the design parameters including parameters relating to input functionality, output functionality, user interface functionality, and print data processing functionality. In addition, the code generator obtains a pointer to a system function that interfaces directly to a system resource such as a physical printer port. Preferably, the code generator also obtains an other pointer to an other function that uses a port or an operating system function to access a system resource. Thereafter, the code generator generates source code in a high-level language such as C, C++, Visual Basic, COBOL, Fortran, Pascal, PL/1, Mesa, ADAC, or any other non-object source code, with the source code implementing the design parameters by including variable definitions for or calls to appropriate ones of the functions in the pre-compiled library, and by including a pointer for or a call to the printer port function that causes printer data to be output to the printer port. Preferably, the source code also includes a pointer for or a call to the other function. Thereafter, the generated source code may be compiled by a standard compiler into a compiled object, and the compiled object can be linked by a link editor with the pre-compiled library of functions, so as to yield an executable which implements desired printer functionality.

The present invention can be used to generate source code for a printer driver for many different systems. For example, the printer driver could be for use with so-called embedded systems. Examples of products that can have embedded systems therein include personal data assistants, WebTV boxes, digital camera converters, telephones, kiosks, game consoles, special purpose (and typically hand-held) devices used by package shipment personnel, supermarket clerks, and civil engineers, and special purpose desktop devices such as cash registers, computer-aided tomography (CAT) devices, and other medical imaging devices. Many other such devices exist.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 1:
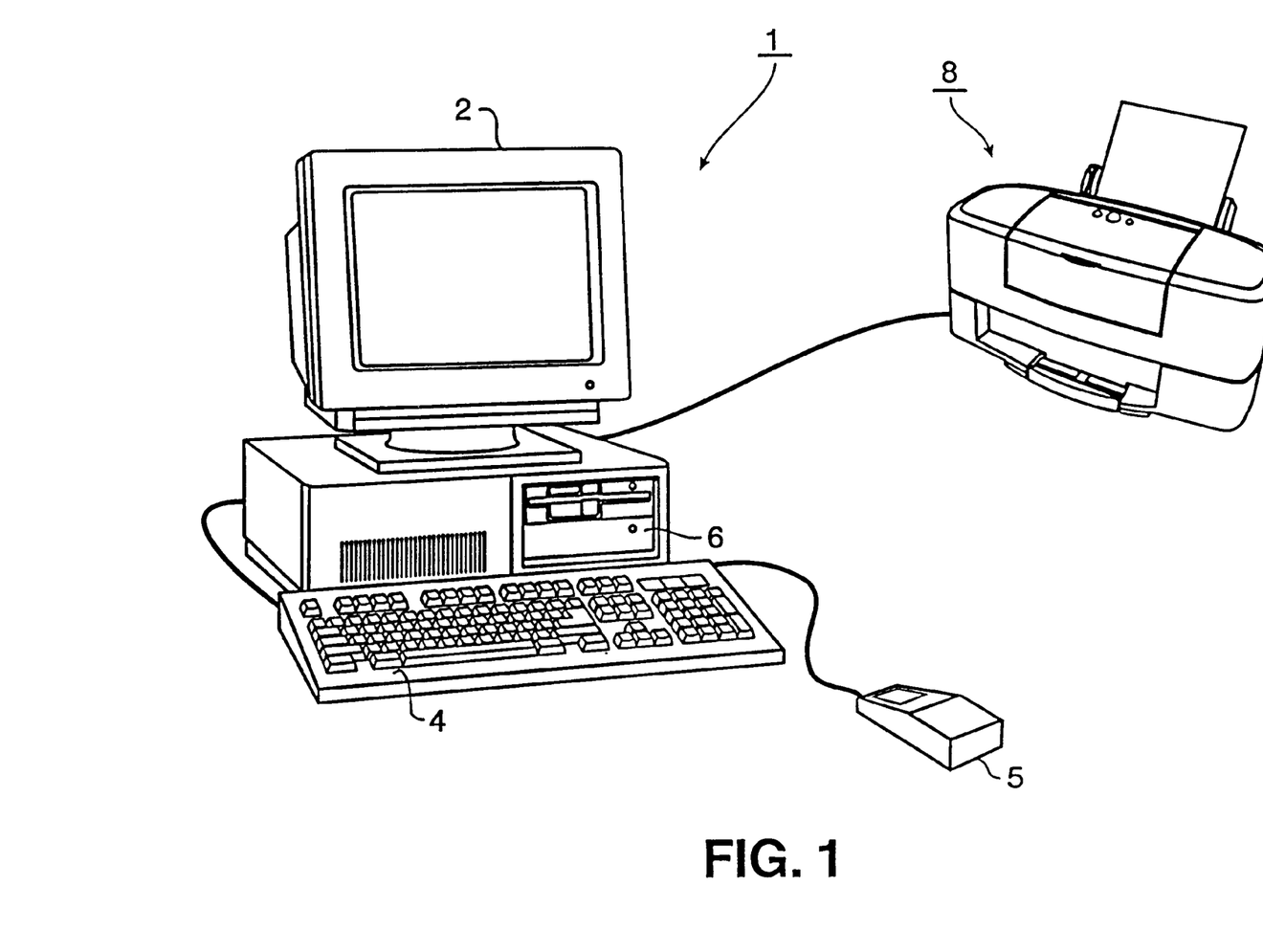
FIG. 1 is a representational view of a computer system in which a code generator of the present invention may be utilized.

FIG. 1 is a representational view of a computer system in which the code generator for a printer driver of the present invention may be utilized. Computer system 1 may be a Macintosh, PC-compatible, or other type of system having an operating system which preferably is a windowing operating system, such as MicroSoft Windows NT®, but which also may be a non-windowing operating system such as DOS or UNIX. In the preferred embodiment, computer system 1 is a Pentium®-based computer system using Microsoft Windows NT®.

Provided with computer system 1 are display 2 which may be a color monitor, keyboard 4 for entering user commands, and pointing device 5 such as a mouse for pointing to and manipulating graphical user interfaces and other objects displayed on display 2.

Computer system 1 also includes a computer readable storage medium, such as mass storage device like fixed disk 6 for storing computer-executable process steps for the operating system, including application programs, a code generator according to the invention, a compiler, and a linker, as well as for storing a pre-compiled library of proprietary printer functions according to the invention and other files. Such storage also may be provided by a CD-ROM (not shown).

Printer 8 is optionally provided for outputting images, printing source code, and the like. It should be noted that the printer driver generated by the invention is not necessarily a printer driver for printer 8, and in most cases will not be.

Although a programmable general-purpose computer is shown in FIG. 1, the code generator of the present invention can be implemented using a dedicated computer terminal or other type of data processing equipment.

Figure 2:
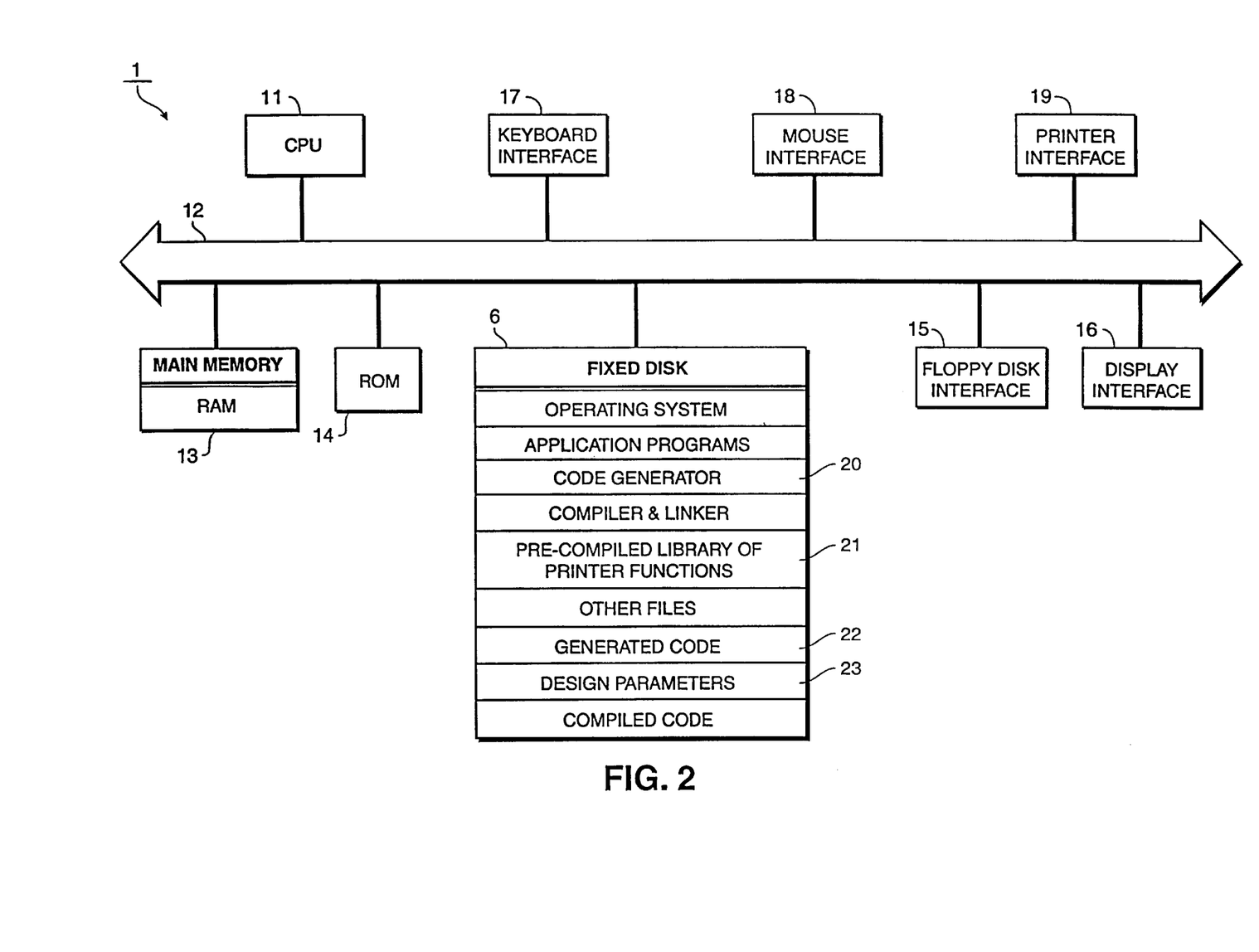
FIG. 2 is a detailed block diagram showing the internal architecture of the computer system of FIG. 1.

FIG. 2 is a detailed block diagram showing the internal architecture of computer system 1. As shown in FIG. 2, computer system 1 includes central processing unit (CPU) 11, which interfaces with computer bus 12. Also interfacing with computer bus 12 are fixed disk 6, main memory (RAM) 13, read only memory (ROM) 14, floppy disk interface 15, display interface 16, keyboard interface 17, mouse interface 18 and printer interface 19 to printer 8.

Main memory 13 interfaces with computer bus 12 so as to provide RAM storage to CPU 11 during execution of software applications. More specifically, CPU 11 loads process steps from a computer readable medium such as fixed disk 6 or some other source such as a network into main memory 13. CPU 11 then executes the stored process steps from main memory 13 in order to execute applications such as the code generator of the present invention. Data, including generated source code 22 and design parameters 23, code compiled from the generated source code, can be stored in main memory 13, fixed disk 6, or some other writable memory medium. Data can also be stored on a mass storage device such as fixed disk 6, and that data can be accessed by applications through well-known disk swapping techniques.

As also shown in FIG. 2, fixed disk 6 typically stores an operating system and application programs. The application programs include code generator 20 according to the invention and a compiler and linker. Fixed disk 6 also preferably stores pre-compiled library 21 of proprietary printer functions for a printer driver.

Code generator 20 generates code in a high-level language for a printer driver that runs on a target system. Examples of high level languages are C, C++, Visual Basic, COBOL, Fortran, Pascal, PL/1, Mesa, ADA, and other non-object source code. The generated code is stored in a file or files such as indicated at 22 in FIG. 2. Once compiled, the code generated by code generator 20 links to functions provided in pre-compiled library 21 so as to provide the printer driver with proprietary functionality without disclosure of proprietary source code that implements that functionality. Typically, the target system that uses the printer driver is different than computer system 1, although it is possible for computer system 1 to include an emulator for the target system so as to aid in debugging.

Alternatively, the generated code can be in a high-level interpreted language such as Basic. In this case, the printer driver links to the pre-compiled library during execution, so fixed disk 6 need not contain the pre-compiled library 21.

Figure 3:
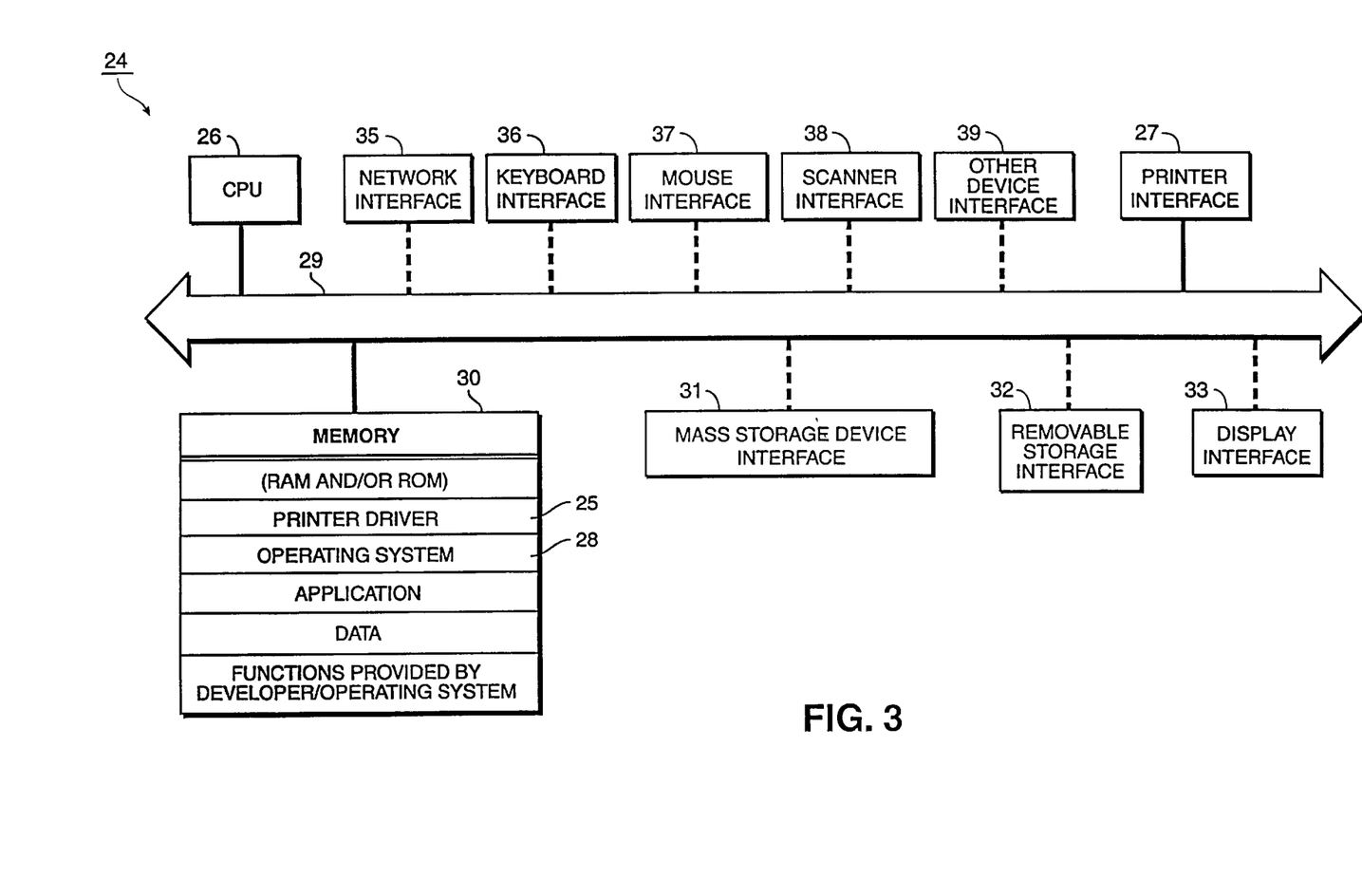
FIG. 3 is a block diagram of a target system for a printer driver generated according to the invention.

FIG. 3 is a block diagram showing the internal architecture of a target system on which runs a printer driver created using the present invention. As shown in FIG. 3, target system 24 includes at least CPU 26 and printer interface 27, both of which are interfaced to bus 29. As shown by dotted lines, target system 24 optionally includes other elements such as memory 30 comprising RAM and/or ROM, mass storage device interface 31, removable storage interface 32, display interface 33, network interface 35, keyboard interface 36, mouse interface 37, scanner interface 38 and other device interface(s) 39. However, as illustrated in FIG. 3, target system 24 need not contain any of these additional elements. For example, target system 24 can be a completely embedded system. Such embedded systems can be found in, for example, cars, personal data assistants, WebTV boxes, digital camera converters, telephones, kiosks, game consoles, special purpose (typically hand-held) devices used by package shipment personnel, supermarket clerks, and civil engineers, and special purpose desktop devices such as cash registers, computer-aided tomography (CAT) devices, and other medical imaging devices. Some of these embedded systems may not include any user interface at all. In addition, target system 24 can include elements other than those shown. For example, target system 24 could be a computer-aided tomography (CAT) device.

For convenience of explanation, it is assumed in this example that target system 24 includes memory 30, in the form of ROM and RAM, in which an operating system, an application such as a CAT program, and a printer driver are all stored. It is understood that other arrangements are possible. For example, target system 24 could simply have an interface for a memory that is connected with printing is desired.

In operation, CPU 26 of target system 24 accesses printer interface 27 using printer driver 25 compiled from source code generated by code generator 20. This printer driver can be supplied to target system 24 by memory 30, mass storage device 31, removable storage device 32, another storage device, or a memory temporarily connected to bus 29 for the express purpose of providing the printer driver to the system. Alternatively, in the case that printer driver 25 is in an interpreted language, mass storage device 31 includes pre-compiled library 21 for linking with printer driver 25 upon execution.

Operating system 28 for target system 24 typically is not the same operating system as used by computer system 1. For example, target system 24 can run under a UNIX operating system or a real-time operating system such as WindRiver's VXWorks™ or Integrated Systems' pSOS™.

These real-time operating systems typically do not insulate the printer driver from the physical printer port like the Windows® GDI kernel. Therefore, the printer driver must send printer data directly to this printer port.

These other operating systems also do not necessarily insulate the printer driver from system resources in the same way as the Windows® operating system. Depending on the operating system, the printer driver must directly access these system resources. For example, the printer driver might need to directly access input devices such as a mouse or keyboard, image-input resources, memory management resources, process control resources, resource locking resources, output devices such as a display, storage devices such as a hard disk, and any other resources required for operation of the printer driver. These system resources typically are accessed either through a port or through an operating system function.

For example, operating system functions might be provided for accessing an input device such as a mouse or keyboard. In the case of a keyboard, the operating system function might buffer input keystrokes for use by target system 24. In that case, printer driver 25 needs to know how to access the operating system's keyboard functions. On the other hand, target system 24 might simply have a designated keyboard port that can be accessed to see what key is currently depressed on the keyboard. In that case, printer driver 25 needs to know how to access the keyboard port.

Likewise, ports or operating system functions can be provided for an image input device. If images from the image input device are to be printed directly to a printer, then printer driver 25 needs to know how to access the image input device.

Memory management resources might be provided. Printer driver 25 uses the memory management resources to reserve memory, thereby guaranteeing that sufficient memory is on hand for printer operations. It should be noted that the operating system could use software for memory management, in which case printer driver 25 needs to know how to use the operating system's memory management functions. Alternatively, the software developer could write custom memory management functions, in which case printer driver 25 only needs to know how to access memory and any special memory management hardware.

Process control resources could be provided for controlling context switching and the like. In a multi-threaded environment (i.e., if operating system 28 is a multitasking operating system), resource locking resources are used to reserve resources for use by printer driver 25.

In the case that output to a display is desired, for example if a graphical user interface is going to be implemented, printer driver 25 accessed ports or operating system functions for a display connected to target system 24. Likewise, if storage is needed, printer driver 25 accesses one or more of any storage devices that are present.

In addition, the printer driver might need to access other operating system functions. Examples of such functions are controlled printed job termination functions and any other system functions that access system resources in ways that differ from one operating system to another. Controlled print job termination functions typically return a value that indicates when it is appropriate to terminate a print job. In particular, under some operating systems, print jobs should only be terminated at certain times. Printer driver 25 accesses these termination functions when a user enters a command to terminate a print job prior to completion.

The foregoing examples of system resources that might be available to a printer driver are by no means exhaustive. Target system 24 could include any, all or none of the foregoing resources, implemented in either hardware or software. The ports and/or operating system functions used to access these resources depend upon the nature of target system 24 and the operating system on that system.

Figure 4:
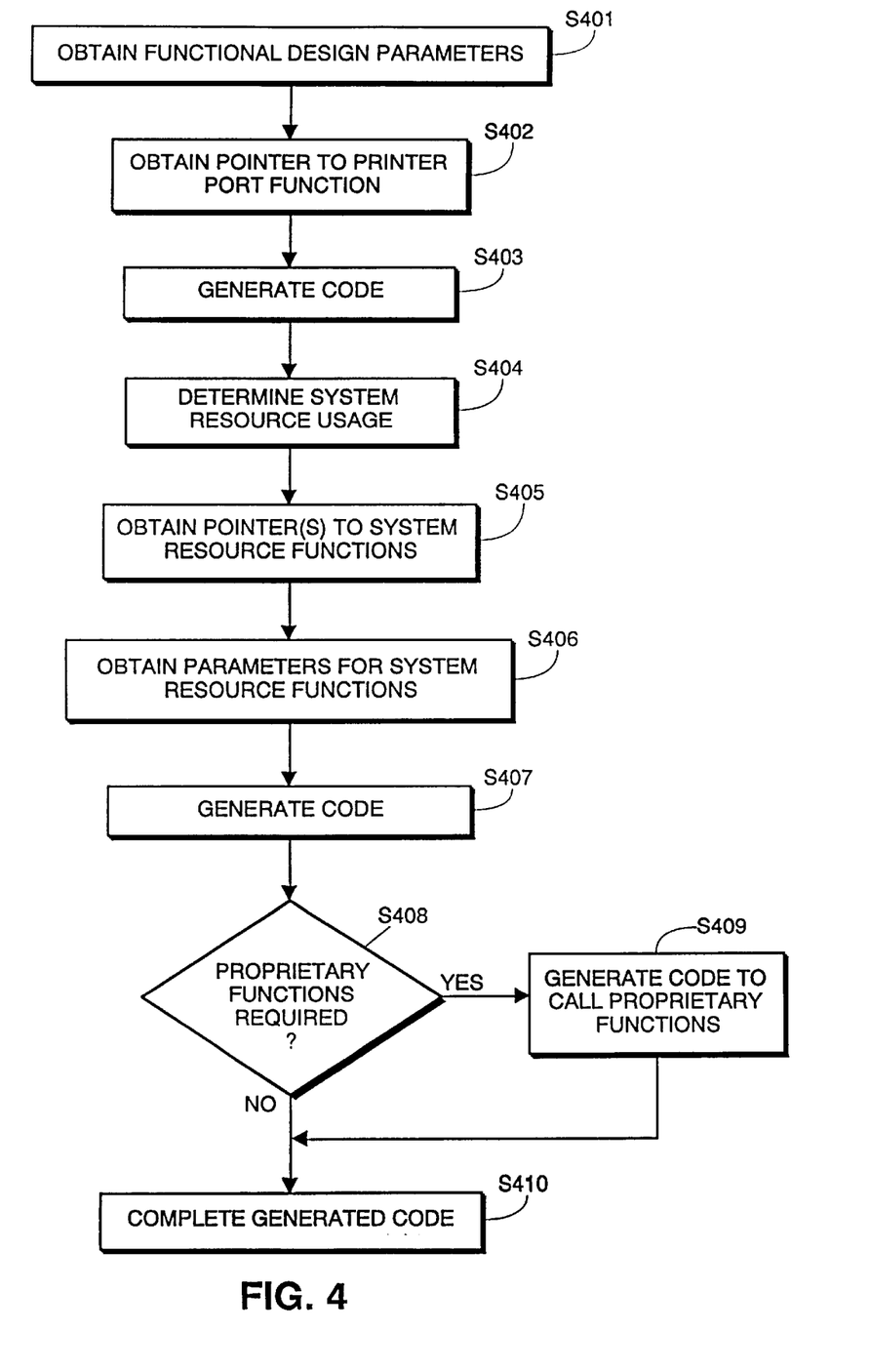
FIG. 4 is a flowchart for explaining the operation of the present invention in generating code for a printer driver.

FIG. 4 is a flowchart illustrating the operation of code generator 20. Briefly, according to FIG. 4, code generator 20 obtains design parameters for printer driver 25. The design parameters include parameters relating to input, output, user interface and print data processing functionality. In addition, the code generator obtains a pointer to a printer port function that interfaces directly to a printer port. Preferably, the code generator also obtains an other pointer to an other function that uses a port or an operating system function to access a system resource. Thereafter, the code generator generates source code in a high-level language such as C or C++, with the source code implementing the design parameters by using appropriate ones of the functions in the pre-compiled library, and by using the printer port function that causes printer data to be output to the printer port. The source code can use the functions either by calling them or by providing variable definitions that tell those functions how to operate. The source code also preferably includes a pointer or a call to the other function that accesses a system resource. Thereafter, the generated source code may be compiled by a standard compiler into a compiled object, and the compiled object can be linked by a link editor with the pre-compiled library of functions, so as to yield an executable which implements desired printer functionality.

Because the code generator is designed to assist developers in creating printer drivers for multiple different operating systems, the code generator cannot know in advance how to access the printer port and the ports and operating system functions for system resources. Accordingly, pointers and parameters for functions that use the ports and operating system functions are obtained by the code generator, which in turn incorporates these pointers and parameters into the generated source code.

In order to generate a printer driver that fully utilizes the functionality of a printer connected to printer interface 27, the code generator generates source code that utilizes color transformation, color matching and halftoning techniques, and other input, processing, and output capabilities specified by the developer. However, source code that implements such capabilities is usually proprietary to the printer manufacturer. Accordingly, in order to utilize such functionality without actually generating source code for those functions, the present invention utilizes pre-compiled library 21 that includes the desired functionality.

Source code for the printer driver generated by code generator 20 includes calls to appropriate ones, as defined by the design parameters, of the functions in pre-compiled library 21. Alternatively, the source code includes variable definitions that instruct those functions how to operate when called. These functions are then linked to the printer driver that is compiled from the generated source code, so as to create a printer driver executable, thereby providing the printer functionality to the printer driver without disclosing the source code that implements the proprietary functions. This approach has the added benefit that the printer driver can take advantage of improvements in these proprietary functions by simply re-linking to an updated library of the functions.

In more detail, in step S401, code generator 20 obtains functional design parameters. for a printer driver. Such functional design parameters include parameters for input, processing, user interface, and output functionality. Examples of parameters for input functionality include image input type and format. Parameters for processing functionality include, for example, complexity and flexibility of color transform and matching techniques available to the end user of the software, halftoning techniques such as selection between dither or error diffusion, and spooling support. Examples of parameters for user interface functionality include whether input from an end user is to be accepted, if a graphical interface is to be used for such input, and the design of such an interface. Parameters for output functionality include, for example, output format such as bitmap or one of several available page description languages (such as PCLS or PostScript), font support and recording medium support (such as plain paper or transparency in the context of computer-aided tomography equipment). In addition, the functional design parameters can include any other system-specific parameters that pertain to input, processing, user interface, and output functionality of the executable driver, when the driver is executing on a target system.

These design parameters can be obtained through interactive processing with a software developer. For example, coded generator 20 running on computer system 1 could query the software developer through display 2 about design choices concerning the foregoing design parameters, and accept responses to these queries through keyboard 4 and mouse 5. Such queries could include queries concerning all of the foregoing design parameters. In addition, these queries could also include queries as to whether or not proprietary functions should be used for certain of the functions of printer driver 25. For example, in the case of color matching, color generator 20 could query the software developer whether to use proprietary color matching functions found in a pre-compiled library, or to allow the developer to write code for color matching.

Alternatively, code generator 20 can obtain the functional design parameters from a database stored, for example, on fixed disk 6 or on a floppy disk. Such a database could include functional design parameters for a printer driver for various operating systems.

Another possible source for functional design parameters is a script, such as a script downloaded from the World Wide Web for a particular type of printer. Other equivalent means for defining the design parameters may also be used, so that the developer can specify input, processing, user interface and output functionality.

After the functional design parameters are obtained, flow proceeds to step S402, where a pointer to a printer port function is obtained. The printer port function, which is typically written by the software developer, directly access printer interface 19 comprising a printer port of target system 24.

In step S403, source code including a call to the printer port function is generated.

Based on the functional design parameters specified by the software developer and on the operating system running on target system 24, step S404 determines what system resources printer driver 25 needs to access. One resource that is almost always required is memory management. In particular, printer driver 25 must allocate memory for printing operations, and then free memory when it is no longer needed. Examples of other resources that might be accessed by printer driver 25 include input devices such as a mouse or a keyboard, image input devices, process control resources, resource locking resources, output devices such as a display, storage devices such as a hard disk, and any other resources required for operation of the printer driver. In addition, operating system functions such as controlled print job termination functions might be accessed by printer driver 25.

In step S405, pointers to functions for accessing the necessary resources are obtained. These functions access the ports or call the operating system functions needed to utilize the system resources. It should be noted that in some cases, the pointer could point directly to an operating system function, if an appropriate function exists.

It should be noted that the term "pointer" is specific to certain high-level languages, such as C, C++ and PL/1. If code generator 20 generates source code 22 in some other language, the equivalent entity in that language is used instead of a pointer. For example, in some languages, the term "address" or "reference" is used for the equivalent entity. The printer port function pointer and system resource pointers can correspond to source or object code supplied by the developer, or to an entry point for the printer driver, as explained in more detail below.

In step S406, any needed parameters for these functions are obtained, preferably using the same mechanism as used to obtain the functional design parameters in step S401 (e.g, querying the software developer). In step S407, source code is generated for calling the appropriate system functions.

By virtue of allowing a software developer to specify pointers to functions for accessing system resources, the code generator can be used to generate code for printer drivers for use with many different operating systems.

Flow then proceeds to step S408, where code generator 20 determines if proprietary functions are required to carry out the specified input, processing, user interface, and output functionality specified by the functional design parameters obtained in step S401. For example, if the software developer specified that proprietary color matching is to be utilized in the printer driver, then flow proceeds from step S408 to step S409. Other examples of proprietary functions include, but are not limited to, functions that implement color transformation, halftoning, output formatting, font support, and error handling. It should be noted that in some cases, particularly in the case of simple printer drivers, no calls to functions in pre-compiled library 21 are needed. In such as case, step S409 is skipped.

In step S409, source code is generated for using the proprietary functions. This code is generated in C, C++, Visual Basic, COBOL, Fortran, Pascal, PL/1, Mesa, ADA, or some other high-level non-object source code. Preferably, the source code includes variable definitions that tell the functions in pre-compiled library 21 how to execute a print job. Alternatively, the source code includes calls to some or all of these functions.

In step S410, the remaining source code for printer driver 25 is generated using pre-existing source code objects. These source code objects preferably are supplied to code generator 20 in a library on a floppy disk or on fixed disk 6. Preferably, the library corresponds to one operating system running on a target system using one type of CPU.

It should be noted that in an alternative embodiment, the ordering of the steps depicted in FIG. 4 is changed. In particular, all of the design parameters need not be specified up front in step S401. Instead, steps S402 through S410 can be performed for each functional design parameter as that parameter is specified by a software developer. In addition, generation of all of the source code can be postponed until step S410, as long as the results of the determinations the preceding steps are stored for reference by step S410. Other re-orderings of the steps shown in FIG. 4 are possible.

The generated source code is preferably in either C or C++. However, the source code can be in any language that can be compiled and linked for use on target system 24. Examples of such languages are COBOL, Fortran, Pascal, PL/1, Mesa, and ADA. In addition, the source code includes variable definitions that tell the function in pre-compiled library 21 how to implement the printer driver when called, including a variable for the pointer to the printer port function. Alternatively, the source code includes calls to the functions in pre-compiled library 21 and the printer port function.

Figure 5:
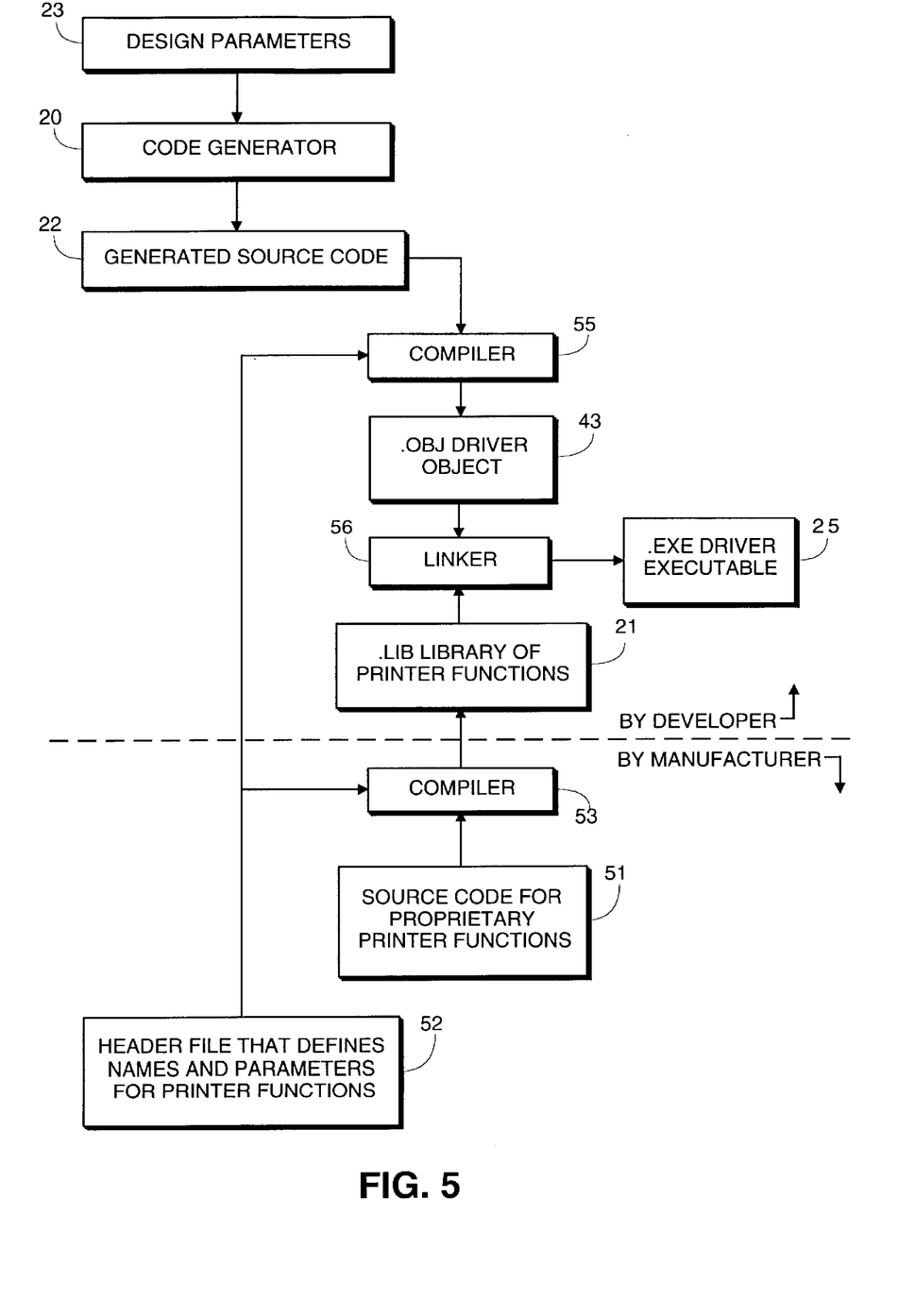
FIG. 5 is a block diagram for explaining creation of a printer driver executable according to the invention.

FIG. 5 is a block diagram for explaining creation of a printer driver executable according to the invention. The blocks above the dashed horizontal line in FIG. 5 represent items created or used by a software developer when creating a printer driver. The blocks below the dashed line represent items created or used by the manufacturer of the printer for target system 24.

Source code 51 is developed by the manufacturer for proprietary printer functions. Header file 52 corresponds to source code 51 and includes statements necessary for compiling source code 51 into pre-compiled library 21, which is illustrated as a ".lib" file. In addition, header file 52 includes statements necessary for linking a library compiled from source code 51 to an object file.

Compiler 53 is used by the manufacturer to compile source code 51 into pre-compiled library 21 using header file 52. Then, both pre-compiled library 21 and header file 52 are made available to a software developer.

Design parameters 23 are functional design parameters input by the code developer. These parameters define input, processing, user interface and output functionality for a printer driver, as discussed in detail above. Code generator 20 uses design parameters 23 and pointers to a printer port function and to system resources so as to generate source code 22, as described above with reference to FIGS. 1 through 4. The software developer uses compiler 55 to compile generated source code 22 into object (".obj") file 43. Linker 56 is then used by the software developer to link object file 43 with pre-compiled library 21, resulting in executable (".exe") printer driver 25.

The pointers to the printer port function and the ports and functions for accessing system resources can be to functions supplied by the developer. If these functions are in source code, they are provided to code generator 20 for inclusion in generated source code 22. If these functions are in object form, they are provided to linker 56, and the linker links the object code for these functions with object file 43 and pre-compiled library 21. In both of these cases, the pointers to these functions are either pre-defined names associated with printer port functions and system resources by code-generator 20 and pre-compiled library 21, or are names defined as functional design parameters by the code developer.

Alternatively, in some operating systems, the actual printer port function and system resources used for a print job are specified when the print job is initiated. Pointers to the printer port function and the system resources are passed to the printer driver through an entry point such as a "start print job" or "setup print job" entry point. In this case, the pointers are passed as parameters to these entry points. Thus, printer driver 25 generated according to the invention must know to look to these parameters so as to find the actual printer port function and system resources to use for a print job. Accordingly, the pointers obtained in order to generate printer driver 25 are pointers to these parameters of the entry point. In other words, the pointers obtained to generate printer driver 25 point to the parameters of the entry point, which in turn point to the actual printer port function or system resources. As a result, printer driver 25 knows how to access the printer port function and the system resources needed for a print job.

Figure 6:
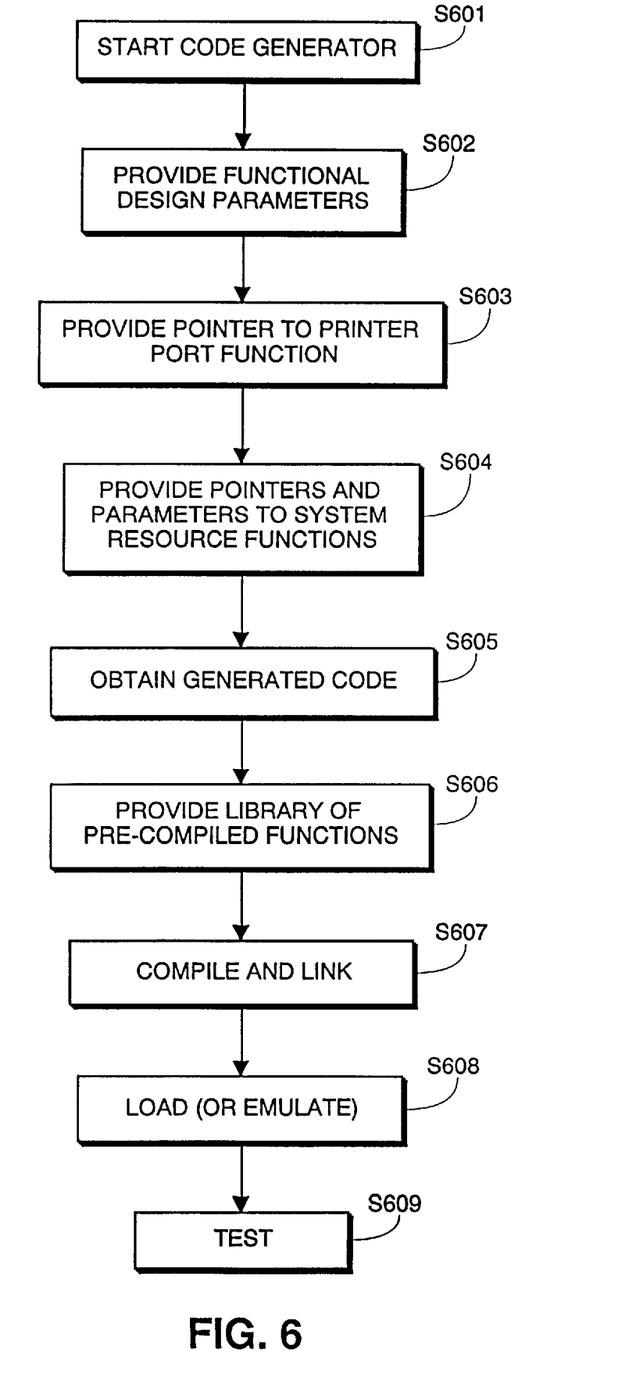
FIG. 6 is a flowchart for illustrating the creation of a printer driver executable according to the invention.

FIG. 6 is a flowchart for showing the operation of the present invention from the perspective of a software developer. Briefly, according to FIG. 6, the software developer provides the code generator with design parameters that define functionality of the printer driver. The software developer then provides the code generator with a pointer to a printer port function that interfaces directly to a printer port. Preferably, a pointer to a function for accessing system resources is also provided. The code generator is used to generate the source code, which includes calls to at least one of the proprietary printer functions in the pre-compiled library and a call to the printer port function. Preferably, the source code also includes a call to the function for accessing system resources. The generated source code is compiled, the compiled code being linkable with the pre-compiled library to obtain an executable.

In more detail, in step S601, the software developer initiates execution of code generator 20 on computer system 1. In step S602, the software developer provides functional design parameters to code generator 20. These functional design parameters are for a printer driver that the software developer is developing. These parameters can be provided in response to queries displayed on display 2 by code generator 20. In that case, the software developer responds using keyboard 4 and mouse 5. Alternatively, the software developer could provide the functional design parameters in a database or in a script.

In step S603, the software developer provides code generator 20 with a pointer to a printer port function that directly access a printer port. The pointer to the printer port function can be provided in several different ways, as discussed above.

In step S604, in response to queries from code generator 20, the software developer provides one or more pointers for functions that access system resources, along with any necessary parameters. These functions in turn access the system resources, either through ports or through operating system functions.

In step S605, the software developer instructs code generator 20 to generate source code 22. This source code is generated as described above with reference to steps S402 through S410 in FIG. 4. Optionally, the software developer can manually add to or modify the source code after it is generated.

In step S606, the software developer provides pre-compiled library 21 which contains functions necessary for implementing the specified functional design for the printer driver, along with corresponding header file 52. In step S607, the source code for the printer driver is compiled into object form. The compiled source code is linked to the library of proprietary functions, resulting in printer driver 25 in executable (".exe") form.

In step S608, printer driver 25 is loaded into target system 24, or alternatively, loaded into an emulator in computer system 1. Then, the printer driver is tested, and any necessary debugging is performed.

By virtue of the foregoing operation, a software developer can use code generator 20 to implement a printer driver that accesses system functions using pointers specified by the software developer. Because the pointers are specified by the software developer, the software developer can tailor the printer driver for use with many different operating systems. In addition, the foregoing operation allows the software developer to utilize proprietary functions provided by manufacturers in pre-compiled form.

The invention has been described with respect to a particular illustrative embodiment. It is to be understood that the invention is not limited to the above described embodiment and that various changes and modifications may be made by those of ordinary skill in the art without departing from the spirit and scope of the invention.

What is claimed is:

1. A method for generating source code in a code generator having a pre-compiled library of proprietary printer functions having entry points accessible by a link editor, said method comprising the steps of:

obtaining design parameters for a printer driver, said design parameters including parameters relating to input functionality, output functionality, user interface functionality, and print data processing functionality;

obtaining a pointer to a printer port function that interfaces directly to a printer port; and generating source code in a high-level language, with the source code implementing the design parameters using appropriate ones of the functions in the pre-compiled library, and by using the printer port function;

whereby the generated source code may be compiled by a standard compiler into a compiled object, and the compiled object can be linked by a link editor with the pre-compiled library of functions, so as to yield an executable which implements desired printer functionality.

2. A method according to claim 1, wherein the source code implements the design parameters through calls to functions in the pre-compiled library, and through a call to the printer port function.

3. A method according to claim 1, wherein the source code implements the design parameters through variable definitions that, when linked to the pre-compiled library, instructs functions in the pre-compiled library how to execute a print job including how to call the printer port function.

4. A method according to claim 1, further comprising the step of obtaining an other pointer to an other function that uses a port or an operating system function to access a system resource, the source code further including the other pointer or a call to the other function.

5. A method according to claim 4, wherein the operating system function is selected from the group consisting of memory management functions, process control functions, controlled print job termination functions, display interface functions, and storage interface functions.

6. A method according to claim 1, wherein design parameters are obtained through interactive processing with a software developer.

7. A method according to claim 1, wherein design parameters are obtained from a database.

8. A method according to claim 1, wherein design parameters are obtained from a script.

9. A method according to claim 1, wherein printer functionality includes functionality pertaining to color matching and halftone processing.

10. A method according to claim 1, wherein input functionality includes functionality pertaining to font support and recording media support.

11. A method according to claim 1, wherein output functionality includes functionality pertaining to output format.

12. An apparatus for generating source code in a code generator having a pre-compiled library of proprietary printer functions having entry points accessible by a link editor, said apparatus comprising:

obtaining means for obtaining design parameters for a printer driver, said design parameters including parameters relating to input functionality, output functionality, user interface functionality, and print data processing functionality, and for obtaining a pointer to a printer port function that interfaces directly to a printer port; and generating means for generating source code in a high-level language, with the source code implementing the design parameters using appropriate ones of the functions in the pre-compiled library, and by using the printer port function;

whereby the generated source code may be compiled by a standard compiler into a compiled object, and the compiled object can be linked by a link editor with the pre-compiled library of functions, so as to yield an executable which implements desired printer functionality.

13. An apparatus according to claim 12, wherein the source code implements the design parameters through calls to functions in the pre-compiled library, and a call to the printer port function.

14. An apparatus according to claim 12, wherein the source code implements the design parameters through variable definitions that, when linked to the pre-compiled library, instructs functions in the pre-compiled library how to execute a print job including how to call the printer port function.

15. An apparatus according to claim 12, further comprising obtaining means for obtaining an other pointer to an other function that uses a port or an operating system function to access a system resource, the source code further including a call to the other function.

16. An apparatus according to claim 15, wherein the operating system function is selected from the group consisting of memory management functions, process control functions, controlled print job termination functions, display interface functions, and storage interface functions.

17. An apparatus according to claim 12, wherein design parameters are obtained through interactive processing with a software developer.

18. An apparatus according to claim 12, wherein design parameters are obtained from a database.

19. An apparatus according to claim 12, wherein design parameters are obtained from a script.

20. An apparatus according to claim 12, wherein printer functionality includes functionality pertaining to color matching and halftone processing.

21. An apparatus according to claim 12, wherein input functionality includes functionality pertaining to font support and recording media support.

22. An apparatus according to claim 12, wherein output functionality includes functionality pertaining to output format.

23. An apparatus for generating source code in a code generator having a pre-compiled library of proprietary printer functions having entry points accessible by a link editor, said apparatus comprising:

a memory including a region for storing executable process steps; and a processor for executing the executable process steps;

wherein the executable process steps include the steps of:
(a) obtaining design parameters for a printer driver, said design parameters including parameters relating to input functionality, output functionality, user interface functionality, and print data processing functionality;
(b) obtaining a pointer to a printer port function that interfaces directly to a printer port; and (c) generating source code in a high-level language, with the source code implementing the design parameters using appropriate ones of the functions in the pre-compiled library, and by using the printer port function;

whereby the generated source code may be compiled by a standard compiler into a compiled object, and the compiled object can be linked by a link editor with the pre-compiled library of functions, so as to yield an executable which implements desired printer functionality.

24. An apparatus according to claim 23, wherein the source code implements the design parameters through calls to functions in the pre-compiled library, and a call to the printer port function.

25. An apparatus according to claim 23, wherein the source code implements the design parameters through variable definitions that, when linked to the pre-compiled library, instructs functions in the pre-compiled library how to execute a print job including how to call the printer port function.

26. An apparatus according to claim 23, wherein the executable process steps further comprise the step of obtaining an other pointer to an other function that uses a port or an operating system function to access a system resource, the source code further including the other pointer or a call to the other function.

27. An apparatus according to claim 26, wherein the operating system function is selected from the group consisting of memory management functions, process control functions, controlled print job termination functions, display interface functions, and storage interface functions.

28. An apparatus according to claim 23, wherein design parameters are obtained through interactive processing with a software developer.

29. An apparatus according to claim 23, wherein design parameters are obtained from a database.

30. An apparatus according to claim 23, wherein design parameters are obtained from a script.

31. An apparatus according to claim 23, wherein printer functionality includes functionality pertaining to color matching and halftone processing.

32. An apparatus according to claim 23, wherein input functionality includes functionality pertaining to font support and recording media support.

33. An apparatus according to claim 23, wherein output functionality includes functionality pertaining to output format.

34. Computer-executable process steps stored on a computer-readable medium, the computer-executable process steps to generate source code in a code generator having a pre-compiled library of proprietary printer functions having entry points accessible by a link editor, said computer-executable process steps comprising:

code to obtain design parameters for a printer driver, said design parameters including parameters relating to input functionality, output functionality, user interface functionality, and print data processing functionality;

code to obtain a pointer to a printer port function that interfaces directly to a printer port; and code to generate source code in a high-level language, with the source code implementing the design parameters using appropriate ones of the functions in the pre-compiled library, and by using the printer port function;

whereby the generated source code may be compiled by a standard compiler into a compiled object, and the compiled object can be linked by a link editor with the pre-compiled library of functions, so as to yield an executable which implements desired printer functionality.

35. Computer-executable process steps according to claim 34, wherein the source code implements the design parameters through calls to functions in the pre-compiled library, and a call to the printer port function.

36. Computer-executable process steps according to claim 34, wherein the source code implements the design parameters through variable definitions that, when linked to the pre-compiled library, instructs functions in the pre-compiled library how to execute a print job including how to call the printer port function.

37. Computer-executable process steps according to claim 34, further comprising code to obtain an other pointer to an other function that uses a port or an operating system function to access a system resource, the source code further including the other pointer or a call to the other function.

38. Computer-executable process steps according to claim 37, wherein the operating system function is selected from the group consisting of memory management functions, process control functions, controlled print job termination functions, display interface functions, and storage interface functions.

39. Computer-executable process steps according to claim 34, wherein design parameters are obtained through interactive processing with a software developer.

40. Computer-executable process steps according to claim 34, wherein design parameters are obtained from a database.

41. Computer-executable process steps according to claim 34, wherein design parameters are obtained from a script.

42. Computer-executable process steps according to claim 34, wherein printer functionality includes functionality pertaining to color matching and halftone processing.

43. Computer-executable process steps according to claim 34, wherein input functionality includes functionality pertaining to font support and recording media support.

44. Computer-executable process steps according to claim 34, wherein output functionality includes functionality pertaining to output format.

45. A computer-readable medium which stores computer-executable process steps, the computer-executable process steps to generate source code in a code generator having a pre-compiled library of proprietary printer functions having entry points accessible by a link editor, said computer-executable process steps comprising:

a first obtaining step to obtain design parameters for a printer driver, said design parameters including parameters relating to input functionality, output functionality and print data processing functionality;

a second obtaining step to obtain a pointer to a printer port function that interfaces directly to a printer port; and a generating step to generate source code in a high-level language, with the source code implementing the design parameters using appropriate ones of the functions in the pre-compiled library, and by using the printer port function;

whereby the generated source code may be compiled by a standard compiler into a compiled object, and the compiled object can be linked by a link editor with the pre-compiled library of functions, so as to yield an executable which implements desired printer functionality.

46. A computer-readable medium according to claim 45, wherein the source code implements the design parameters through calls to functions in the pre-compiled library, and a call to the printer port function.

47. A computer-readable medium according to claim 45, wherein the source code implements the design parameters through variable definitions that, when linked to the pre-compiled library, instructs functions in the pre-compiled library how to execute a print job including how to call the printer port function.

48. A computer-readable medium according to claim 45, wherein the computer-executable process steps further comprise a third obtaining step to obtain an other pointer to an other function that uses a port or an operating system function to access a system resource, the source code further including the other pointer or a call to the other function.

49. A computer-readable medium according to claim 48, wherein the operating system function is selected from the group consisting of memory management functions, process control functions, controlled print job termination functions, display interface functions, and storage interface functions.

50. A computer-readable medium according to claim 45, wherein design parameters are obtained through interactive processing with a software developer.

51. A computer-readable medium according to claim 45, wherein design parameters are obtained from a database.

52. A computer-readable medium according to claim 45, wherein design parameters are obtained from a script.

53. A computer-readable medium according to claim 45, wherein printer functionality includes functionality pertaining to color matching and halftone processing.

54. A computer-readable medium according to claim 45, wherein input functionality includes functionality pertaining to font support and recording media support.

55. A computer-readable medium according to claim 45, wherein output functionality includes functionality pertaining to output format.

56. A method for building a printer driver using a code generator that generates source code linkable to a pre-compiled library of proprietary printer functions having entry points accessible by a link editor, said method comprising the steps of:

providing the code generator with design parameters that define functionality of the printer driver;

providing the code generator with a pointer to a printer port function that interfaces directly to a printer port;

obtaining generated source code from the code generator, the source code including variable definitions for or calls to at least one of the proprietary printer functions in the pre-compiled library and a pointer or a call to the printer port function; and compiling the generated source code, the compiled code being linkable with the pre-compiled library to obtain an executable which implements desired printer functionality.

57. A method according to claim 56, further comprising the step of completing portions of the source code with manually generated source code.

58. A method according to claim 56, further comprising providing an other pointer to an other function that uses a port or an operating system function to access a system resource, the source code further including a call to the other function.

59. A method according to claim 58, wherein the operating system function is selected from the group consisting of memory management functions, process control functions, controlled print job termination functions, display interface functions, and storage interface functions.

60. A method according to claim 59, further comprising the step of loading the executable in a target system.

61. A method according to claim 60, further comprising the step of testing the executable in the target system.

* * * * *

UNITED STATES PATENT AND TRADEMARK OFFICE
CERTIFICATE OF CORRECTION

PATENT NO. : 6,449,050 B1
DATED : September 10, 2002
INVENTOR(S) : John S. Haikin It is certified that error appears in the above-identified patent and that said Letters Patent is hereby corrected as shown below:

Column 3,
Line 24, "code" should read -- code that --.

Column 8,
Line 51, "parameters." should read -- parameters --.

Column 9,
Line 37, "access" should read -- accesses --.

Column 10,
Line 29, "as" should read -- a --.

Signed and Sealed this

Twenty-third Day of September, 2003

JAMES E. ROGAN
*Director of the United States Patent and Trademark Office*